(12) United States Patent
Berg

(10) Patent No.: US 7,449,636 B2
(45) Date of Patent: Nov. 11, 2008

(54) CABLE BEND STIFFENER

(75) Inventor: Arne Berg, Kattem (NO)

(73) Assignee: Optoplan AS, Trondheim (NO)

( * ) Notice: Subject to any disclaimer, the term of this patent is extended or adjusted under 35 U.S.C. 154(b) by 0 days.

(21) Appl. No.: 11/619,322

(22) Filed: Jan. 3, 2007

(65) Prior Publication Data

US 2008/0121427 A1 May 29, 2008

(30) Foreign Application Priority Data

Nov. 6, 2006 (NO) .................................. 20065098

(51) Int. Cl.
*H02G 15/07* (2006.01)
(52) U.S. Cl. .............................................. 174/74 R
(58) Field of Classification Search .............. 174/74 R, 174/21 R; 367/191; 285/114; 181/115
See application file for complete search history.

(56) References Cited

U.S. PATENT DOCUMENTS 4,759,001 A * 7/1988 Keckler et al. .............. 367/191

2004/0238266 A1* 12/2004 West et al. .................. 181/115

FOREIGN PATENT DOCUMENTS

| DE | 3816287 A1 | | 11/1989 |
| DE | 202005015710 U1 | | 12/2005 |
| EP | 859182 | * | 8/1998 |

OTHER PUBLICATIONS

British Search Report dated Feb. 4, 2008.

* cited by examiner

*Primary Examiner*—Chau N Nguyen
(74) *Attorney, Agent, or Firm*—Patterson & Sheridan, L.L.P.

(57) ABSTRACT

A bend stiffener includes a first elongate member having a longitudinal conduit and a second elongate member also having a longitudinal conduit connected to an end of the first member thereby effectively extending the length of the bend stiffener. The first member has a resilience to bend when the bend stiffener is subject to a certain load, i.e. at a large tension and small angle, while the second member is designed to have less resilience than the first member, whereby the second member starts bending earlier than the first member when the bend stiffener is subjected to a smaller load, i.e. at a low tension and/or a large angle. The first and second members may provide one or more channels from the second member to the hydrophone. The channel surfaces may have a nonmetallic material. The second member has a resilience to transfer incident pressure waves into the channel therein.

14 Claims, 2 Drawing Sheets

CABLE BEND STIFFENER

CROSS-REFERENCE TO RELATED APPLICATIONS

This application claims benefit of Norwegian patent application serial number 20065098 filed Nov. 6, 2006, which is herein incorporated by reference.

BACKGROUND OF THE INVENTION

1. Field of the Invention

Embodiments of the invention relate to bend stiffeners for flexible members. More particularly, embodiments of the invention relate to bend stiffeners for use with cables for interconnecting one or more seismic stations placed at subsea locations with suitable control and monitoring equipment.

2. Description of the Related Art

A bend stiffener is typically used at cable terminations at cable splice units, regenerator units, or the like in subsea cable applications where it is desirable to improve the load capacity of the cable and cable termination. A cable termination is typically installed with the cable and attached units from a cable ship or other installation vessel.

Lateral movements of a subsea cable may occur due to environmental loading, underwater currents or handling during installation and removal of the cable. In particular, the cable proximate a splice unit, regenerator or sensor unit may be subject to large bending forces in the above situations due to a combination of angular misalignment and tension. If suitable protective means are not used, the bending forces may exceed the bending capacity of the cable causing undesirable tear, fracture or even full breakage. It is a common technique to use bend stiffeners to improve the bending capacity of cables at such cable terminations, thus increasing the bend radius of the bending curve of the cable for a given load on the cable.

For the cable terminations three typical load situations occur. Firstly, the small loads (2-20 times the weight of the unit) and large angular displacements (up to 90 degrees) occurring when the unit is raised vertically from horizontal storage. Secondly, in connection with the onboard handling and movement over a running wheel of the ship (typical diameter 3-6 m) with strain from the cable etc. (determined by cable weight, ocean depth, etc.), the typical load is 1.2-1.5 times the weight of the free cable in water. Over the running wheel a typical angular displacement from the axis of 25-40 degrees may occur. The last situation happens when lifting a unit from the ocean bottom. If the unit has been buried (for protection purposes or due to movement of material on the ocean bottom) for a long time (10-30 years) large forces may be required to lift the unit. The cable is typically drawn almost vertically upwards (at up to 90 degrees to the direction of the cable at the ocean bottom), and the cable and unit is stuck in nearly "coagulated" mass. Fortunately, experience indicates that the loosening process provides a shaping of the cable which somewhat limits the bending of the cable. Normally, it is not required that the cable need to be undamaged when it is taken out of the seafloor.

Ocean Bottom Seismic (OBS) systems, which may be at least partly buried on the ocean bottom, include hydrophones intended to measure pressure waves in the ocean at or near the ocean bottom. The hydrophone is a part of a measuring station which may also contain geophones or accelerometers, and is normally protected by a stiff external housing. On the ocean floor, the station may be left as a unit enclosed by a mass of loose sediments from a flushing operation (or ploughing). Sand may also enter into the open spaces of the station and partly fill the holes which have been provided for allowing entry of pressure waves.

Such sediment mass may become fixed or hardened during time when the particulate matter (sand, silt, clay, etc.) packs together. Dependent on the bottom conditions, this mass may become relatively rigid and have a large resistance to water flowing through it. If the compressibility of the volume that the station represents becomes high (low bulk modulus) in relation to the surrounding masses, the pressure build-up may require some time to occur. The hydrophone thus may measure a lower response for signals of high frequencies than for static pressures.

OBS systems include a cable and stations having metallic parts necessary for, e.g., mounting and connecting the different parts to each other. These may be subject to corrosion when placed on the ocean bottom. A common method of avoiding such problems is to provide cathodic protection. Sink anodes are attached to the unit and these serve to prevent the corrosion of metallic parts of the station/cable. Cathodic protection is a galvanic process which involves the dissociation of water. This process may in some cases cause the formation of gas. If the gas is collected in the station (or in the cavity this represents when buried), it may in effect result in a very high compressibility (low bulk module). Measurements of pressure waves may thus be strongly affected (see above paragraph).

There exists a need for an improved bend stiffener suitable for use with ocean bottom cables intersected by subsea units, such as seismic stations, splice units, and regenerator units, which improves the bending curve and/or load distribution along the bend stiffener and the associated end of the cable when such a cable with attached units are being installed and removed, typically to and from locations at large sea depths. A further need exists to reduce or eliminate the problems related to gas formation, especially from cathodic protection when the cable with the units is placed on the sea bottom.

SUMMARY OF THE INVENTION

According to embodiments of the invention, there is thus provided a bend stiffener having a first substantially elongate member having a longitudinal through-going conduit and a second member having also a longitudinally through-going conduit. The conduits are designed to allocate a cable being terminated at a unit that the bend stiffener is mounted onto. The second member is arranged at one end of the first member thereby effectively extending the bend stiffener in its longitudinal direction. The first member has an amount of resilience in order to be able to bend when the bend stiffener is loaded in the transverse direction, while the second member is produced from a material yielding a second member being more resilient than the first member in order that the second member may start bending at transversal loads which are so low that there is hardly any bending of the first member. This bend stiffener provides an improved bending of the cable at the termination, whereby the risk of damage and fracture of the cable during handling is reduced.

According to another aspect of the invention, the bend stiffener constitutes an interface between the hydrophone and the surroundings. According to this embodiment, the bend stiffener comprises channels stretching from the second member to the hydrophone. As the second member is resilient, the pressure waves propagate through the material and are lead by the channels to the hydrophone through the more rigid first member. From the first member to the hydrophone, the channel is lead through a more rigid channel so that it is not affected by gas in the chamber containing the abovementioned metal parts. The channel through both members and rigid channel have non-metallic surfaces against the sea water, thus this embodiment of the invention provides a bypass avoiding the areas being subject to gas formation.

BRIEF DESCRIPTION OF THE DRAWINGS

The invention is described below in further detail with reference to the accompanying drawings in which illustrate the invention by way of example.

DETAILED DESCRIPTION

Figure 1A:
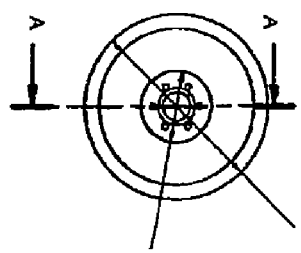
FIGS. 1 and 1A illustrate an example embodiment of the bend stiffener according to the invention.
Figure 1:
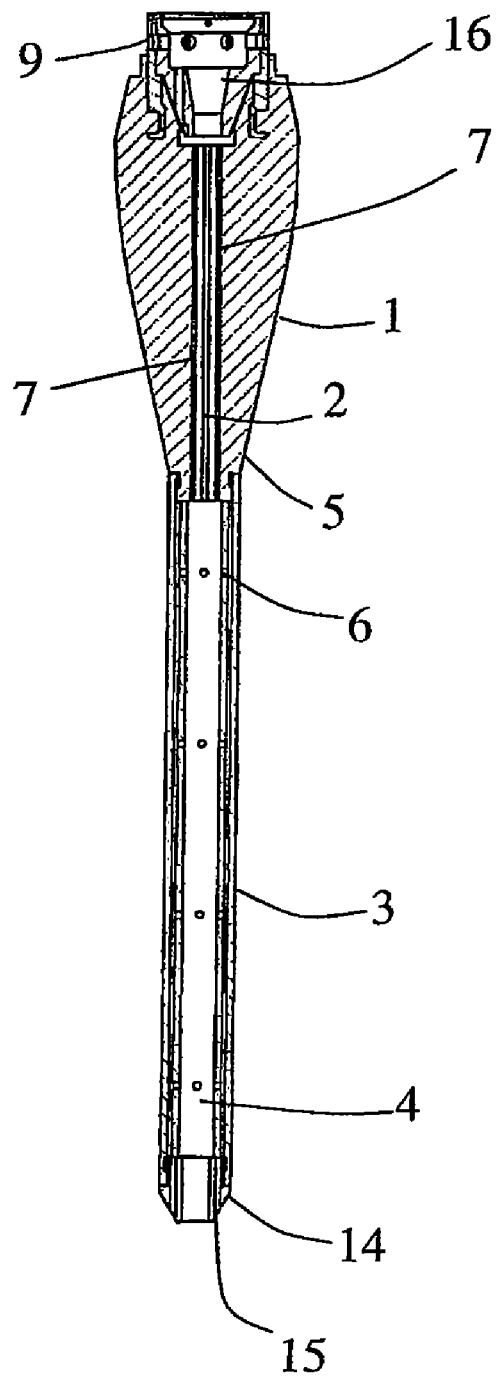

FIG. 1 illustrates a bend stiffener according to embodiments of the invention which comprises a first substantially elongate member 1 having a longitudinal conduit 2 and a second member 3 having also a longitudinal conduit 4. The first member 1 may have a shape and size typical for conventional bend stiffeners which are dimensioned for the loads experienced during handling on a running wheel onboard a cable installation vessel. At one longitudinal end 5 of the first member 1, one end 6 of a second member 3 is connected, thereby effectively extending the length of the bend stiffener in its longitudinal direction.

While the first member 1 can be any type of conventional bend stiffener, the second member 3 may be a substantially cylindrical, flexible, tubular member, and may be formed from one or more sections of a conventional flexible hose. The second member 3 may also be a type of bend limiter.

The second member is, in one embodiment, a hose made from a material which is more "soft" or less resilient then the first member 1. The first member 1 has an amount of resilience in order to be able to bend when the bend stiffener is loaded at high tension at small angles, while the second member 3 may be produced from a material yielding the second member 3 which is less resilient than the first member 1. The result is that the second member 3 starts yielding/ bending at loads having force components in a transversal direction which are so low as not to cause significant yielding/ bending of the first member 1.

The second member 3 may be made with a smaller cross-sectional dimension than the first member 1 in order to provide the lower resilience. Alternatively, the same effect can be achieved by producing the second member 3 in a material having a lower elastic modulus than the first member 1, that is, the result is that the second member 3 tends to bend more easily than the first member 1 when experiencing external forces (low tension at large angles). In an alternative, the second member 3 may be made so as to combine a lower cross-sectional dimension and lower elastic modulus to achieve the desired effect.

Thus, the second member 3, for example in the form of a hose, effectively functions as a bend stiffener at relatively small loads, for example as experienced during normal handling onboard an installation vessel. The use of the second member 3 having the properties as stated, also provides improved bending and load distribution when the cable and station is raised up from the ocean bottom after long term deployment, possibly in a buried state.

Figures 2, 2A, 2B:
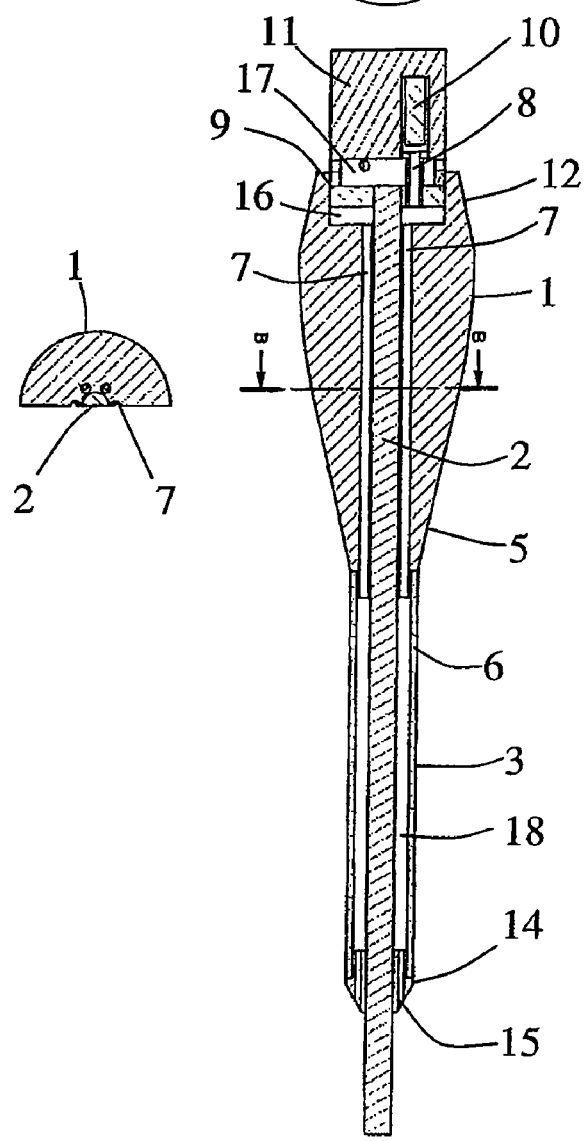
FIGS. 2, 2A and 2B illustrate an exemplary embodiment of a bend stiffener according to the invention as coupled to a hydrophone unit of a seismic station.

Now referring to FIG. 2, when the compound bend stiffener according to the present invention is used with a seismic station 11 the addition of the second member constitutes a significant increase in the compressive area of the seismic station 11. Normally, the external surface of the seismic station 11 is formed by a metal housing and rigid/stiff bend stiffeners. The pressure wave is allowed into a hydrophone 10 through holes in an outer part of the metal housing. This provides small openings for "refill" of water for the build-up of pressure around the hydrophone 10.

When the second member 3 is arranged according to the embodiment shown, this second member 3 functions as a large membrane for the hydrophone. Water enclosed by the membrane/second member is forced towards the hydrophone and builds up the pressure to be detected.

The bend stiffener is provided with at least one internal, longitudinal channel 7 being coupled with at least one corresponding channel 8 in a termination part 9 of the bend stiffener. When in use, the bend stiffener termination 9 is typically connected to the hydrophone 10 of the seismic station 11, whereby the channels 7, 8 provide a fluid coupling from water between the second member and the cable to the hydrophone 10. Thus, the channels 7, 8 of the bend stiffener function to provide pressure transfer for the hydrophone 10. The pressure transfer extends from a first end 5 of the first member 1 at which end the second member 3 is connected to a second end 12 of the first member 1, for the transfer of pressure changes from the region of the second member 3. Hence, when the second member 3 is being compressed by an external pressure wave, a corresponding pressure wave is coupled into the hydrophone 10 of the seismic station 11 via the channels 7, 8. In one embodiment of the bend stiffener according to the invention, the pressure transfer arrangement comprises longitudinal grooves along an internal wall of the conduit 2. In yet a further embodiment of the bend stiffener according to the invention, the pressure transfer arrangement comprises any number of channels separate from, but substantially parallel with the conduit 2.

The second member 3 of the bend stiffener may be terminated in a sleeve or muff 14 at the end most remote from the hydrophone. The second member 3 is partially blocked at one end by the sleeve or muff, however, the sleeve or muff is provided with small openings or grooves 15 for allowing an interior volume of the bend stiffener to be filled with water during deployment at a subsea location. Thus, the internal volumes of the bend stiffener and seismic station housing may fill with water when the cable and seismic station is lowered to the bottom of the sea. The openings or grooves 15 of the sleeve or muff 14 may have so small dimensions that the inflow of sand during burial at the ocean bottom and during rinsing or flushing operations may be strongly limited. In order to ease the entry of the bend stiffener into guides, conduits, braking systems or other cable handling devices which is used on the installation vessel, a part of the external surface of the sleeve or muff 14 is produced with a conical shape.

Traditionally, the formation of gas from corrosion processes may cause problems for the correct operation of hydrophones in seismic stations if the formed gas is allowed to gather internally in the housing, and such that the gas communicates with the liquid near the hydrophone. This problem can be avoided when using a bend stiffener according to the present invention by manufacturing both the first and second members of the bend stiffener from a polymer material and by ensuring the cable arranged in the conduits 2, 4 of the bend stiffener is covered by a non-metallic coating, such as a polymer coating. Further, the interior water filled volumes of the bend stiffener are coupled to the liquid volume of the hydrophone via a rigid pipe. Thus, the hydrophone may measure the pressure in a liquid volume where there is no formation of gas provided all surfaces capable of enclosing a volume of water and capable of coupling with the hydrophone are adapted to prevent the generation of gas due to corrosion.

The first member of the bend stiffener according to the invention is manufactured as a conventional bend stiffener, for example by molding polyurethane. A metal part is normally included in the first member for mechanically anchoring the first member to the station/housing. The dimensions and material properties are determined by the expected load conditions over the running wheel during pull-up (of large lengths of cable).

The longitudinal channels 7 in the first member 1 for allowing pressure coupling between the volume enclosed by the second member 3 (hose) and the hydrophone 10 can be produced during the molding process as grooves on the internal surface facing the cable or as one or more separate channels near the cable. The channels can all be made to end in a small pressure collection volume 16 near the base of the bend stiffener where it couples to the hydrophone 10. The pressure collection volume 16 has a passage 8 for coupling with the hydrophone 10 of the seismic station 11. The passage 8 for coupling with the hydrophone 10 is arranged so as to be isolated from the remaining parts of a seismic station 11 for which the bend stiffener can be used to protect a connected flexible cable running from the seismic station 11 to other equipment (not shown). The passage can be made from a polymer pipe or pipe-like element which is impermeable to hydrogen. Further, the pipe or pipe-like element can be painted or otherwise surface treated in order to prevent internal development of gas. The passage 8 should be tight towards the surroundings in order to prevent gases from any corrosion processes from entering into the passage.

The second member 3 of the bend stiffener can be produced from one or more conventional hoses or it can be molded or extruded with dimensions to fit the bend stiffener. Diameter, wall thickness and material properties are determined by the initial handling before and during installation (lifting from basket which applies low loads and large bend angles) and coupling to pressure waves. The second member 3 can be attached to the first member 1 by direct molding, adhesion or attachment using conventional cable clamps on a pipe-sleeve.

The hose can be terminated in a sleeve having small air holes or grooves in order to allow water to enter during lowering into the sea. The small holes or grooves may limit possible inflow of sand during the subsequent burial/flushing. The sleeve can be made conical in order that the hose more easily may enter into conduits/brake systems which are used on the installation vessel.

In conclusion, the embodiments of the present invention provide a new type of bend stiffener which is able to accommodate large variations in bending forces/angles when used to strengthen a cable termination at a subsea unit. This is highly desirable when handling cables, in particular seismic cables, at large ocean depths. The first member is suited for large loads during installation and the second member for low loads during lifting from baskets etc.

As mentioned above, embodiments of the invention also provide solutions for avoiding gas generated by a metal having cathodic protection disturbing the detection of pressure waves by the hydrophone. The second member 3 is made from a resilient material and includes at least one channel 18. When pressure waves hit the second member 3 the signal is transferred through the second member channel 18 to communicating first member channel or channels 7. The pressure waves then propagate through a rigid channel 8 to the hydrophone 10. In the illustrated example, the metal parts having cathodic protection are positioned in a second chamber 17. This second chamber 17 is provided with a pressure relief channel to the surrounding environment. The shape and number of conduits constituting the channel may vary, from the cylindrical space between the channel to separate channels, in which case the receipt of pressure waves to the hydrophone is independent of the presence of the cable. According to the illustrated example, the channels may be constituted by a number of smaller conduits distributed around the center of the member or members.

Gas from the metallic surfaces affecting the hydrophone coupling is thus avoided, resulting in an improved hydrophone signal.

The outer end 14 of the second member channel 18 may be provided with channels 15 for slow pressure equalization without letting the received pressure waves out of the channel in that direction. The presence or size of the leak channels 15 depends on the need for avoiding intrusion of sand or other materials from the sea bottom into the channels. The cross section of the second member is illustrated as being circular, but other shapes may be possible, e.g. flat or elliptic, which may provide advantages, for example when the hydrophone and bend stiffener is positioned at the sea bottom where it may be covered by more or less hard bottom materials.

To summarize, the bend stiffener according to embodiments of the invention comprises a first substantially elongate member 1 having a longitudinal conduit 2 and a second substantially elongate member 3 having also a longitudinal conduit 4 being connected essentially coaxially to an end 5 of the first member 1. Thus, the effective compound length of the bend stiffener is extended. The first member 1 has a chosen amount of resilience in order to be able to bend when the bend stiffener is loaded at a large tension, most likely at a small angle, while the second member 3 is designed so as to have less resilience than the first member. Thus, the second member may start bending earlier than the first member at a lower tension and allow for bending at a large angle.

As mentioned above, the problems related to gas occurring as a result of cathodic protection may be avoided by producing the first and second members from a chosen polymer material. In addition, the cable arranged in the conduits 2, 4 of the bend stiffener may be covered by a non-metallic coating, such as a polymer coating. In this way, the contact between the sea water and the metal parts is limited, both by the chosen materials and by the barrier provided by the bend stiffener. Although polymers are mentioned as one material according to embodiments of the invention, other materials may also be used, as long as they are suitable for avoiding contact between metal and sea water, and providing the required resilience depending on the specific use.

The conduits or channels (7, 18, 16, 8) acting as waveguides to the hydrophone are sealed against the second chamber 17 wherein the gas is generated. This may be done by using an O-ring between the cable 2 and the wall separating the pressure collecting chamber 16 from the second chamber 17, and also a similar seal related to the connecting channel 8 between the hydrophone 10 and the pressure collecting chamber 16. It should also be noted that the two parts of the bend restrictor in some cases may be made in one piece having a gradual transition between them.

What is claimed is:

1. A bend stiffener for coupling a subsea unit at a location along an ocean cable, comprising:

an elongate first member having a first longitudinal conduit, wherein the first elongate member defines a termination part designed to connect to the subsea unit; and an elongate second member having a second longitudinal conduit connected to an end of the first member thereby effectively extending a length of the bend stiffener, wherein the first member has a chosen resilience in order to be able to obtain a suitable bend when the bend stiffener is subject to a first load, while the second member is designed so as to have less resilience than the first member, whereby the second member starts bending earlier than the first member when the bend stiffener is subjected to a second load smaller than the first load, wherein the first and second members are each provided with at least one channel, the channels extending from the second member to a hydrophone with surfaces of the channels having a nonmetallic material, and the second member having a resilience adapted to transfer incident pressure waves into the channel therein.

2. The bend stiffener according to claim 1, wherein the channels are provided in between the members and the cable positioned in the conduits therein, the cable covered by a non-metallic coating.

3. The bend stiffener according to claim 2, wherein the non-metallic coating is a polymer coating.

4. The bend stiffener according to claim 1, wherein the nonmetallic material is a polymer.

5. A bend stiffener for coupling a subsea unit at a location along an ocean cable, comprising:
an elongate first member having a first longitudinal conduit, wherein the first elongate member defines a termination part designed to connect to the subsea unit; and
an elongate second member having a second longitudinal conduit connected to an end of the first member thereby effectively extending a length of the bend stiffener, wherein the first member has a chosen resilience in order to be able to obtain a suitable bend when the bend stiffener is subject to a first load, while the second member is designed so as to have less resilience than the first member, whereby the second member starts bending earlier than the first member when the bend stiffener is subjected to a second load smaller than the first load wherein the second member is a substantially cylindrical, flexible, tubular member, wherein the first member is provided with a pressure transfer path extending from the end of the first member where the second member is arranged, to the opposite end of the first member, for the transfer of pressure changes from the region of the second member when the second member is being compressed.

6. The bend stiffener according to claim 5, where the pressure transfer path comprises longitudinal grooves along an internal wall of the first longitudinal conduit.

7. The bend stiffener according to claim 5, where the pressure transfer path comprises any number of channels separate from, but substantially parallel with, the first longitudinal conduit.

8. The bend stiffener according to claim 5, comprising a pressure collection volume, the pressure collection volume having a passage for coupling with a hydrophone of a seismic station.

9. The bend stiffener according to claim 8, wherein the passage for coupling with the hydrophone is arranged so as to be isolated from remaining parts of the seismic station for which the bend stiffener protects an end of a flexible cable.

10. The bend stiffener according to claim 8, wherein the passage is defined by at least one of a pipe which is impermeable to hydrogen and a pipe like element which is impermeable to hydrogen.

11. A bend stiffener for coupling a subsea unit at a location along an ocean cable, comprising:
an elongate first member having a first longitudinal conduit, wherein the first elongate member defines a termination part designed to connect to the subsea unit; and
an elongate second member having a second longitudinal conduit connected to an end of the first member thereby effectively extending a length of the bend stiffener, wherein the first member has a chosen resilience in order to be able to obtain a suitable bend when the bend stiffener is subject to a first load, while the second member is designed so as to have less resilience than the first member, whereby the second member starts bending earlier than the first member when the bend stiffener is subjected to a second load smaller than the first load, wherein the second member is terminated in a sleeve or muff, the sleeve or muff having openings or grooves for allowing an interior volume of the stiffener to be filled with water during deployment at a subsea location.

12. The bend stiffener according to claim 11, wherein the sleeve or muff has a conical shape configured to ease the entry of the bend stiffener into guides, conduits, or cable handling devices.

13. A bend stiffener for coupling a subsea unit at a location along an ocean cable, comprising:
an elongate first member having a first longitudinal conduit, wherein the first elongate member defines a termination part designed to connect to the subsea unit; and
an elongate second member having a second longitudinal conduit connected to an end of the first member thereby effectively extending a length of the bend stiffener, wherein the first member has a chosen resilience in order to be able to obtain a suitable bend when the bend stiffener is subject to a first load, while the second member is designed so as to have less resilience than the first member, whereby the second member starts bending earlier than the first member when the bend stiffener is subjected to a second load smaller than the first load,
wherein the second member is terminated in a sleeve or muff, the sleeve or muff having openings or grooves for allowing an interior volume of the stiffener to be filled with water during deployment at a subsea location, wherein the openings or grooves are dimensioned to limit inflow of sand.

14. A cable system for use in an ocean, comprising:
an ocean cable;
a subsea station disposed along the ocean cable, wherein the station includes a hydrophone;
an elongate first member having a first longitudinal conduit surrounding a portion of the ocean cable adjacent the subsea station, wherein the first member couples to the subsea station; and
an elongate second member having a second longitudinal conduit surrounding a further portion of the ocean cable, wherein the second member is connected to an end of the first member thereby effectively extending a length of a bend stiffener formed by the elongate members, wherein the second member has less resilience than the first member, and wherein the first and second members are each provided with at least one channel, the channels extending from the second member to the hydrophone, and the second member having a resilience adapted to transfer incident pressure waves into the channel therein, wherein a nonmetallic material defines surfaces of the channels.

* * * * *